United States Patent [19]

Klimek et al.

[11] Patent Number: 5,701,334
[45] Date of Patent: Dec. 23, 1997

[54] PATH LENGTH DELAY COMPENSATION IN AN OPEN-LOOP SYSTEM

[75] Inventors: John Ramon Klimek, Cupertino; David Weiss, Palo Alto, both of Calif.

[73] Assignee: Siemens Business Communication Systems, Inc., Santa Clara, Calif.

[21] Appl. No.: 736,873

[22] Filed: Oct. 25, 1996

Related U.S. Application Data

[63] Continuation of Ser. No. 422,674, Apr. 13, 1995, abandoned, which is a continuation of Ser. No. 994,392, Dec. 21, 1992, abandoned.

[51] Int. Cl.[6] ............................................. H04L 7/06
[52] U.S. Cl. ................ 375/364; 375/373; 340/825.14; 340/825.2
[58] Field of Search .................................. 375/322, 356, 375/358, 362, 364, 371, 373; 340/825.14, 825.2; 370/503, 507; 327/141; 326/93; 395/551

[56] References Cited

U.S. PATENT DOCUMENTS

| | | | |
|---|---|---|---|
| 3,562,432 | 2/1971 | Gabbard | 370/95.1 |
| 3,995,111 | 11/1976 | Tsuji et al. | 375/358 |
| 4,757,521 | 7/1988 | Korsky et al. | 375/358 |
| 4,792,963 | 12/1988 | Campanella et al. | 375/358 |
| 4,805,195 | 2/1989 | Keegan | 375/354 |
| 4,849,997 | 7/1989 | Suzuki et al. | 375/371 |
| 5,056,120 | 10/1991 | Taniguchi et al. | 375/371 |
| 5,109,393 | 4/1992 | Saegusa | 375/357 |

*Primary Examiner*—Wellington Chin
*Assistant Examiner*—William Luther

[57] ABSTRACT

One can compensate for signal propagation delay in an open-loop system of interconnected components by fixing overall path propagation time and selectively adjusting transmit timing at each of the interconnected components.

8 Claims, 5 Drawing Sheets

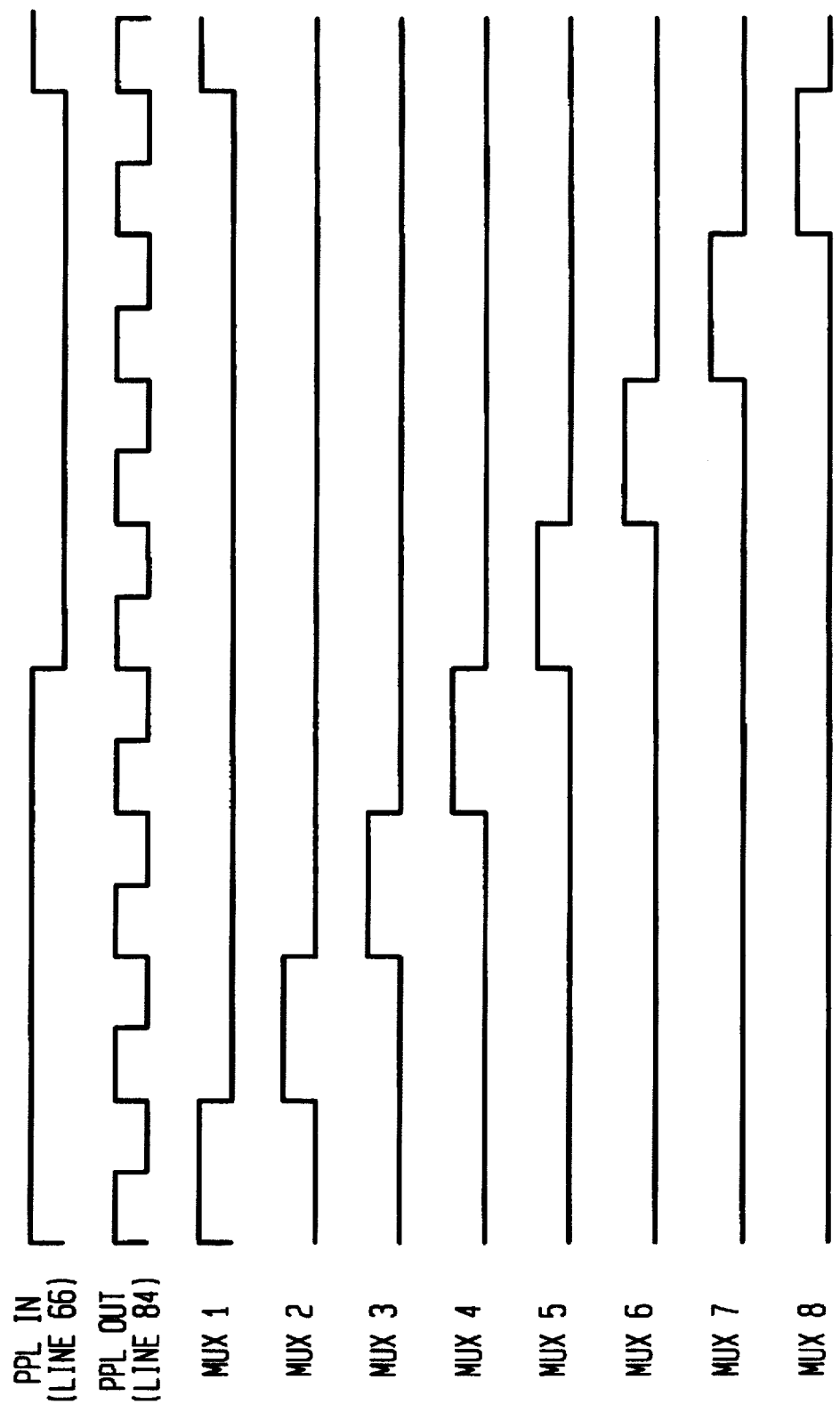

PATH LENGTH DELAY COMPENSATION IN AN OPEN-LOOP SYSTEM

CROSS-REFERENCE TO RELATED APPLICATION

This is a continuation of Ser. No. 08/422,674 filed Aug. 13, 1995, now abandoned which is a continuation of Ser. No. 07/994,392, Dec. 21, 1990, now abandoned.

FIELD OF THE INVENTION

This invention generally relates to the interconnection of units in a system. Specifically, the invention is directed to an apparatus and method for compensating for signal propagation delay in open-loop systems.

BACKGROUND OF THE INVENTION

When dealing with two components interconnected in an open-loop system, one must provide a means of coordinating communications between the components. Some systems, for example, require that data from one component be received at another component at a specific point in time relative to a system clock. Because of the propagation delay experienced by the data in traveling between the components, one has to account for that delay on the receiving end. When the path delay is variable, such as where the length of an interconnecting cable varies, the accompanying variation in propagation time must be taken into consideration.

SUMMARY OF THE INVENTION

These and other objects are achieved by a path delay compensation scheme that adjusts the time of transmission of data from one component in a system to another to cause data to arrive at that other component at a precise time relative to a local clock signal.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein:

FIG. 6 is a timing diagram showing the outputs of the multiplexer in the variable clock-shift module.

DETAILED DESCRIPTION OF THE INVENTION

Figure 1:
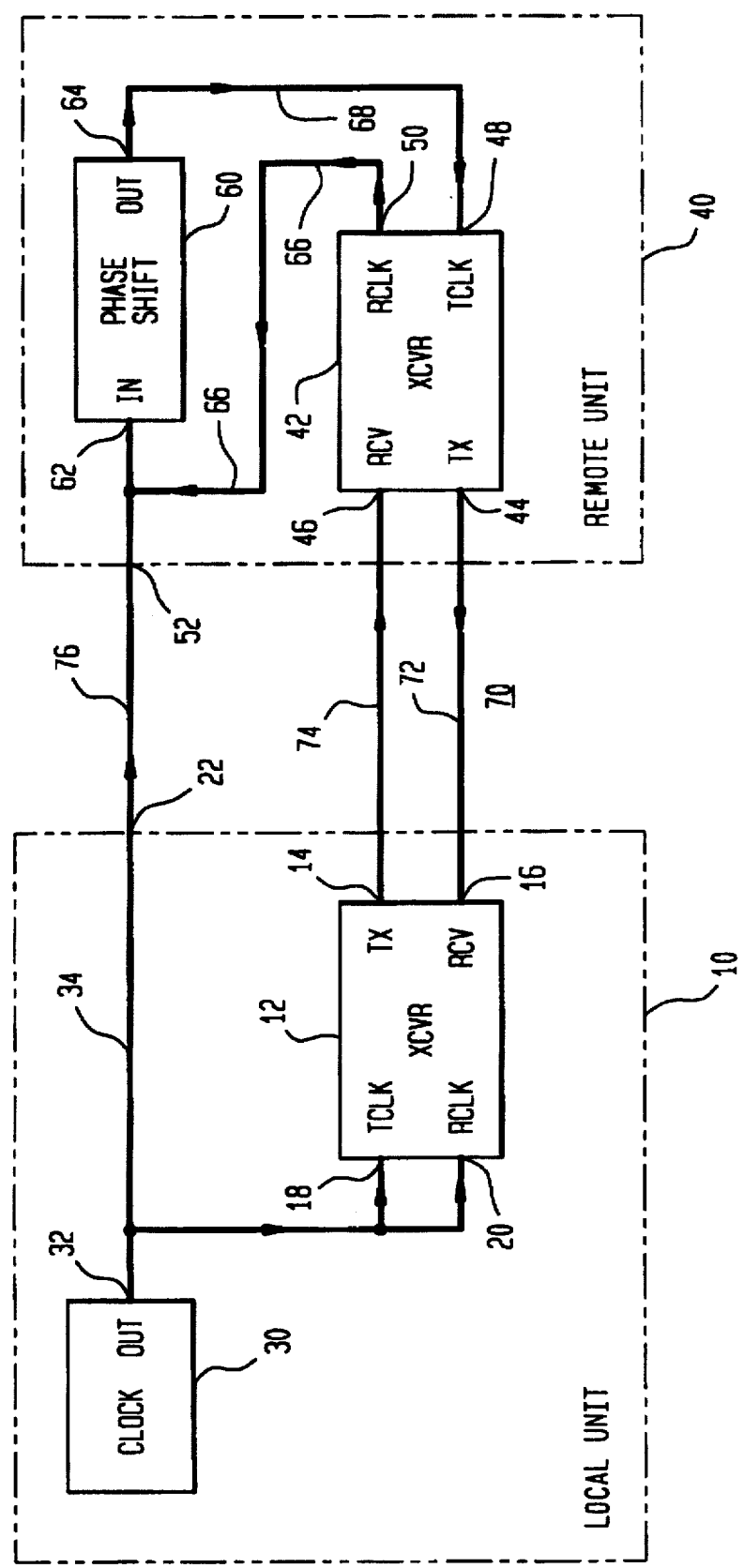
FIG. 1 is a schematic block diagram of a system incorporating the invention.

A block diagram of a communication system is shown in FIG. 1. The system has two communications units, arbitrarily labeled local 10 and remote 40, interconnected by a communications path 70. Both the local unit 10 and the remote unit 40 each have a transmitter-receiver 12, 42. The transmitter-receivers 12, 42 each have a transmit port 14, 44, a receive port 16, 46, a transmit clock input 18, 48, and a receive clock input 20, 50.

The local unit 10 has three ports: the transmit port 14 and the receive port 16 of the transmitter-receiver 12, and a local clock port 22. A clock 30, having a clock output 32, provides a local clock signal on local timing line 34 to the transmit and receive clock inputs 18 and 20 of the transmitter-receiver 12. The clock signal output is also provided for transmission to the remote unit 40 at the local clock port 22.

The remote unit 40 also has three ports: the transmit port 44 and the receive port 46 of the transmitter-receiver 42, and a remote clock port 52. The remote unit 40 contains a phase shift module 60 having an input 62 and an output 64. The input 62 is connected to the remote clock port 52 by an input clock line 66 and the output 64 is connected to a remote timing line 68, which in turn provides transmit timing to the transmitter-receiver 42 through its transmit clock input 48. The input clock line 66 is also connected to the receive clock input 50 of the remote unit's 40 transmitter-receiver 42.

The local and remote units 10 and 40 are interconnected by a transmission path, in the case illustrated in FIG. 1 the path being a cable 70. The cable 70 has two unidirectional transmission lines 72 and 74, which may carry data in serial, parallel, or some other form (digital, analog, etc.), and a unidirectional synchronization clock line 76. Line 72 interconnects the transmit port 44 in the remote unit 40 with the receive port 16 in the local unit 10. Similarly, line 74 interconnects the transmit port 14 in the local unit 10 with the receive port 46 in the remote unit 40.

The synchronization clock line 76, being connected between the local clock port 22 and the remote clock port 52, provides the remote unit 40 with the clock timing signal generated in the clock 30 of the local unit 10. The cable 70 could well have other lines but they are not illustrated here. Because a timing signal is not returned with the data, the system is characterized as open-loop.

Figure 2:
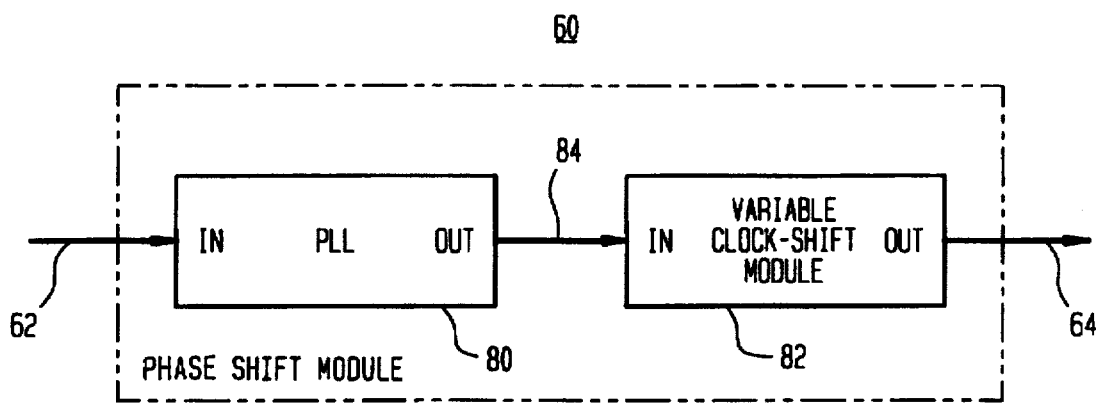
FIG. 2 is a schematic block diagram of the phase shift module.
Figure 3:
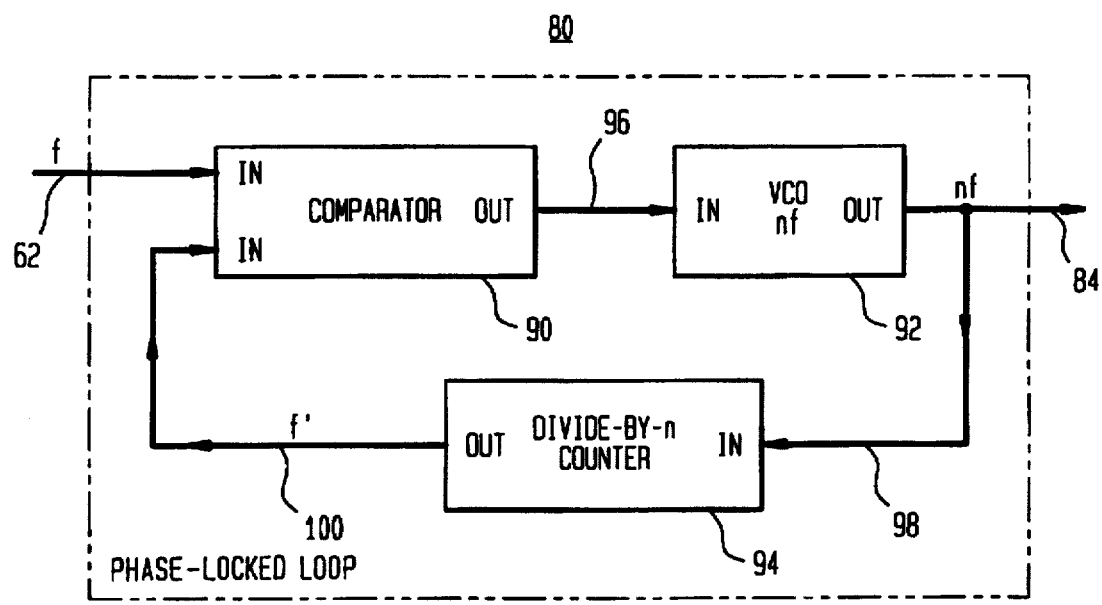
FIG. 3 is a schematic block diagram of the phase-locked loop circuit.

As shown in FIG. 2, the phase shift module 60 has a phase-locked loop 80 feeding a variable clock-shift module 82 through line 84. The phase-locked loop 80, shown in greater detail in FIG. 3, has a comparator 90, a voltage-controlled oscillator 92, and a divide-by-n counter 94, interconnected by lines 96, 98, and 100 as shown in the figure.

Figure 4:
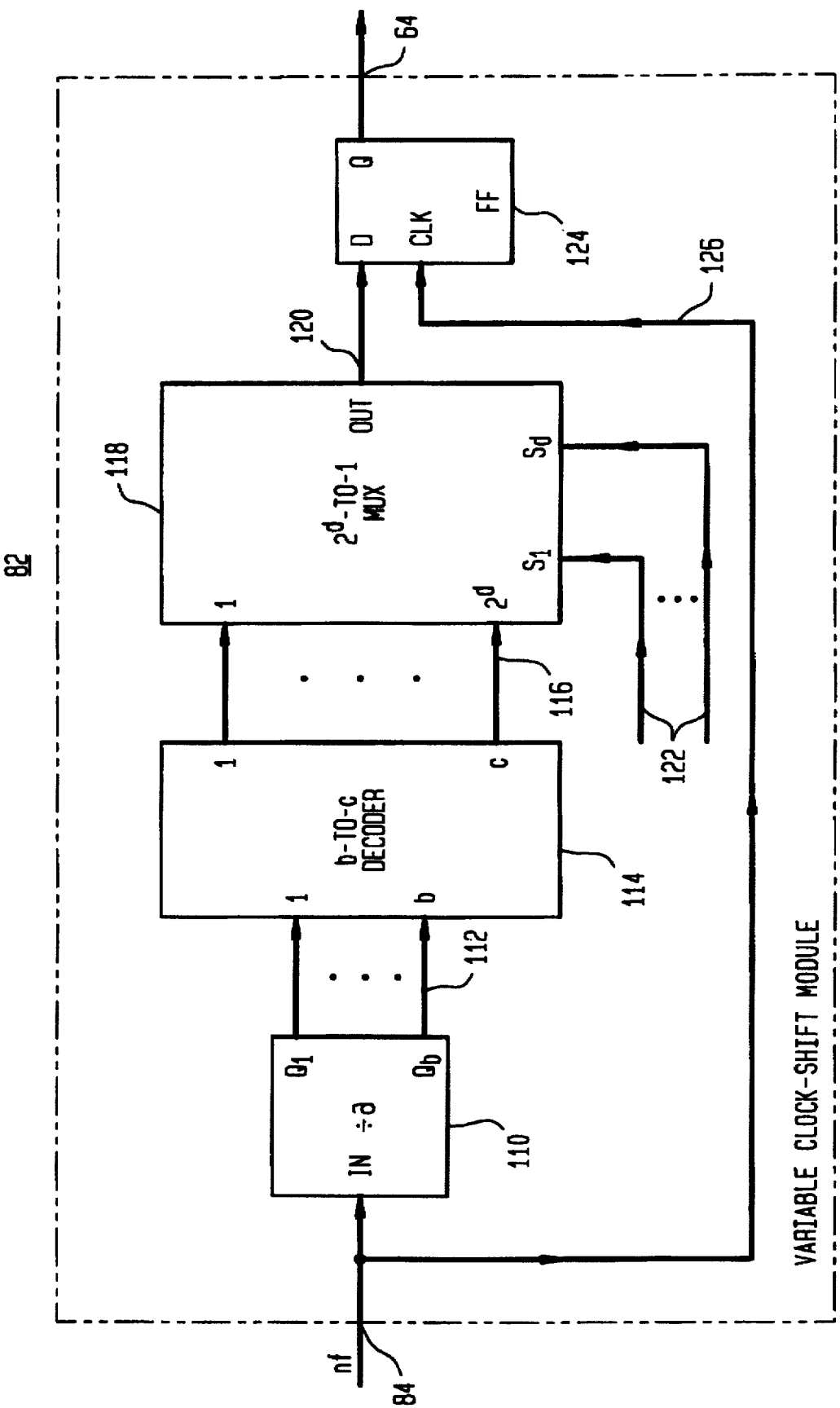
FIG. 4 is a schematic block diagram of the variable clock-shift module.

The variable clock-shift module 82 is shown in FIG. 4. The module 82 essentially divides a clock signal of frequency nf into $2^d$ selectable pulses at a intervals over some period $\tau=(=a/nf)$, where $a \geq d$, each of which has a different phase relationship with respect to each other. The input (line 84) to the module 82 is connected to a divide-by-a counter 110 having b outputs, $Q_1$ through $Q_b$, where $b \geq \log_2 a$ in a binary system. These b outputs are connected by lines 112 to corresponding inputs 1 through b of a b-to-c decoder 114. The outputs 1 through c of the decoder 114 are connected in turn by lines 116 to inputs 1 through $2^d$ of a $2^d$-to-1 multiplexer 118, respectively.

The multiplexer 118 is enabled by select lines 122 connected to select inputs $S_1$ through $S_d$, and its output is connected to the D input of a D-type flip-flop 124. The clock signal is provided on a clock input line 126 tied to line 84. The output 64 of the module 82 is the Q output of the flip-flop 124. An example of the selectable outputs MUX1–MUX8 of the multiplexer 118 is illustrated by the timing diagram in FIG. 6, which assumes a division-by-8 of the clock signal on line 84.

For simplicity of presentation, there is a one-to-one correspondence between the respective interconnections of the counter 110, the decoder 114, and the multiplexer 118. However, it should be understood that this is not required and one may choose to omit and/or transpose selected connections to suit individual design needs.

An additional module, not shown in the overall block diagrams of FIGS. 1 and 2, is the bit-shifting module 140. This component can be inserted at the transmit port 44 of the transmitter-receiver 42 in the remote unit 40. However, one could place this module 140 on either side of the port 44. The purpose of the bit-shifting module 140 is to adjust the time of transmission of the data in some selected number of whole-bit increments, as determined by the user.

Figure 5:
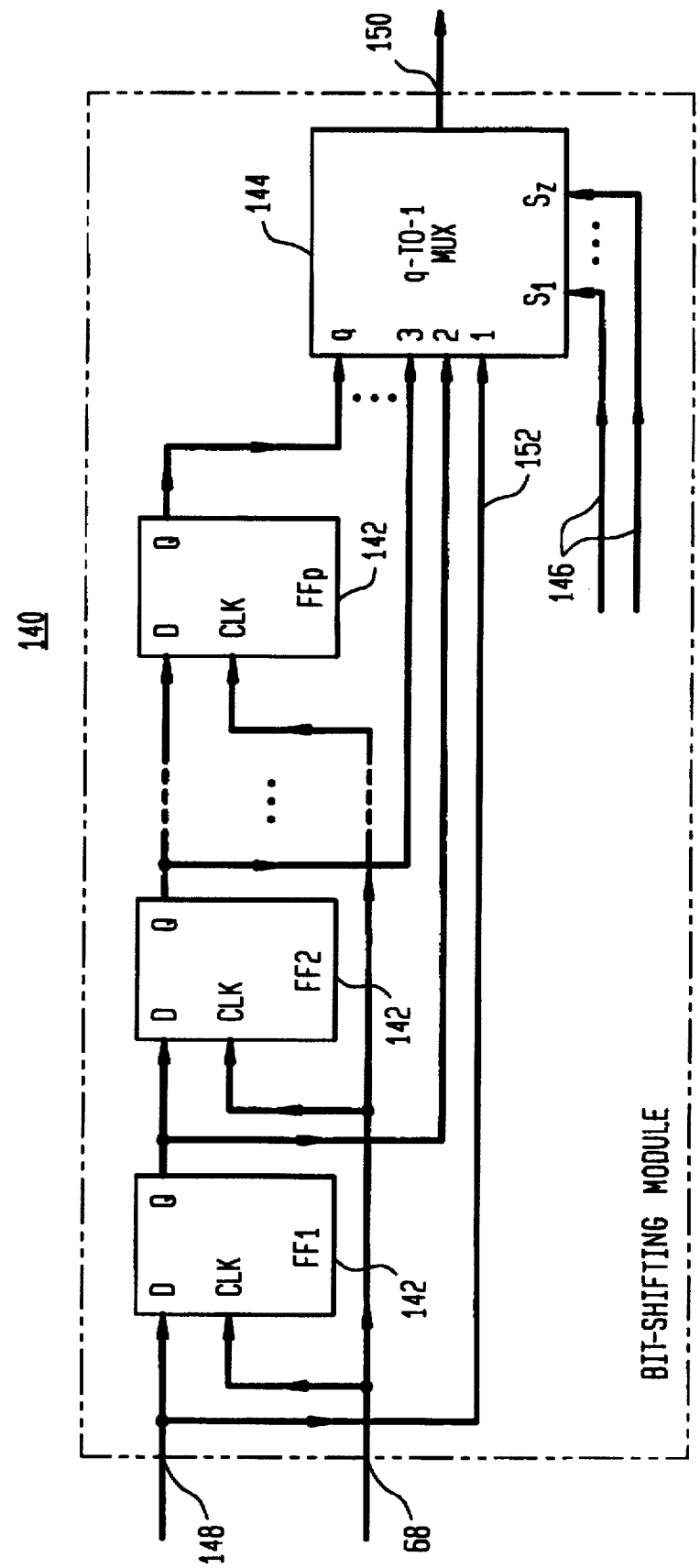
FIG. 5 is a schematic block diagram of the bit delay module.

As shown in FIG. 5, the bit-shifting module 140 is a series of p cascaded D-type flip-flops 142, having a data input 148 connected to the D input of the first flip-flop FF1 142. The Q output of every flip-flop 142 but the last is tied to the D input of the next device. The clock input is derived from the output of the phase shift module 60 on fine 68. The data input 148 and the Q outputs of the flip-flops are also provided by fines 152 as inputs to a q-to-1 multiplexer 144, where q=p+1. The multiplexer 144 is enabled by z select lines 146 connected to select inputs $S_1$ through $S_z$, to provide an output 150.

Operation of the System

Consider bidirectional communications between the local and remote units 10 and 40. The local unit 10 transmits data along line 74 to the remote unit along with a synchronizing clock signal on fine 76. When the data arrives at the transmitter-receiver 42 in the remote unit 40, it is clocked in by the received clock signal applied to receive clock port 50.

To send data from the remote unit 40 to the local unit 10, the timing must now be coordinated as the local unit 10 will be looking for the data at a precise point in time $T_D$ relative to the synchronizing signal (line 34) at the receive clock input 20. This represents the total round trip delay from the local unit 10 to the remote unit 40 and back again.

To achieve a transfer within this period of time, one must account for the propagation delay time of the cable ($T_c$ each way) and the propagation delay of the electronics of the remote unit 40 ($D_E$). Given that a round trip entails passage of the synchronizing clock signal through the cable 70 to the remote unit 40, and then passage of the data through the remote unit 40 and onto and through the cable 70 to the local unit 10, the total delay time $T_D$ will be $2 \cdot T_C + D_E$. The quantity $T_D$ is selected to allow for the largest required round trip transit time.

Since changes in path delay between the units 10 and 40 (denoted as $T_c'$) will result in variations in total propagation time, a variable quantity $T_S$ is utilized to achieve a constant $T_D$, where:

$$2 \cdot T_c' + D_E + T_S = T_D. \tag{1}$$

The time interval $T_S$ represents the shift in time of the data that must occur in the remote unit 40 so that the data is received at the local unit in an elapsed time of $T_D$.

The time shift $T_S$ would have possibly one, two, or more components. The first component is $T_{sf}$, the fractional bit time shift. Depending on the desired granularity, one could shift the timing of the transmit clock signal at transmit clock input 48 in the remote unit 40 by some fractional portion of one bit length, as illustrated in FIG. 6 using the circuit of FIG. 4, effectively time shifting the data an equivalent amount.

The second component is $T_{sb}$, the whole bit time shift of the data (FIG. 5). This affords a time shift greater than $T_{sf}$.

If desired, one could achieve a greater delay by shifting larger units, such as a byte of data. Therefore, the total shift $T_s$ would be the sum of $T_{sf}$, $T_{sb}$, and perhaps a further component. Given that $$T_D = 2 \cdot T_c' + D_E + T_S \tag{2}$$

and, assuming only two components of shift:

$$T_D = 2 \cdot T_c' + D_E + T_{sf} + T_{sb}. \tag{3}$$

Since $T_D$ and $D_E$ are fixed numbers, and the value of $T_c'$ is determined by the path delay through the cable, one can thus calculate $T_{sf}$ and, if need be, $T_{sb}$. In most applications, insertion of the $T_{sf}$ component will be sufficient. Where a greater delay is desired, one may have to resort to $T_{sb}$. Therefore:

$$T_{sf} + T_{sb} = T_D - (2 \cdot T_c' + D_E) \tag{4}$$

The exact values of $T_{sf}$ and $T_{sb}$ are set by enabling the select lines 122 and 146 of the $2^2$-to-1 multiplexer 118 and the q-to-1 multiplexer 144, respectively. To perform the selection in the outputs of the multiplexers 118 and 144, the appropriate select lines 122 and 146 would be connected to ground or $V_{cc}$ as required. It should be understood that one could use $T_{sb}$ independently of $T_{sf}$ if whole-bit manipulation would provide sufficient resolution. Moreover, if no shift is desired, one could select either an unshifted multiplexer output signal (MUX1 in FIG. 6) or the signal on the input clock line 66. The latter could be provided directly to the transmit clock input 48, bypassing the phase shift module 60.

It should also be understood that the local and remote clocks may differ in frequency and duty cycle as required by the particular implementation. Also, the transmit data rates and the synchronization clock frequency may differ. Moreover, this scheme can be used with systems having more than two components. For example, where there are three or more communications modules connected in a system, the same method of adjusting the transmit time relative to a clock at the ultimate destination will serve to insure that data arrives at the receiving module at the proper time.

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, this method could also have other applications such as compensating for delay over a wireless path (e.g. such as a microwave link), where the distance changes depending on the application. Also, the techniques here are not limited to digital data, but may encompass analog signals as well.

What is claimed is:

1. An apparatus for maintaining timing synchronization for communication of data between a first point and a second point, wherein the timing synchronization is represented by a selectable timing differential between the first and second points, said timing differential being selected without using a signal from said second point to said first point comprising:

means, located at the second point, for receiving a receive timing signal transmitted from the first point to the second point;

means for generating a transmit timing signal, the means for generating a transmit timing signal having means for inducing a phase shift of the transmit timing signal relative to the receive timing signal, said phase shift being equal to the difference between the selectable timing differential and a propagation delay between the first and second points; and means, responsive to the transmit timing signal, for transmitting the data from the second point to the first point synchronous to the transmit timing signal.

2. An apparatus as in claim 1 wherein said timing differential is provided by digital circuitry.

3. An apparatus for maintaining timing synchronization for communication of data between a first point and a second point, wherein the timing synchronization is represented by a selectable timing differential between the first and second points, said timing differential being selected without using a signal from said second point to said first point, comprising:

means, located at the second point, for receiving a receive timing signal having a receive timing signal frequency, said receive timing signal being transmitted from the first point to the second point, and for producing an output having a multiplicity of pulses, the output having a pulse repetition rate equal to a selectable multiple of the receive timing signal frequency and being synchronous to the receive timing signal;

means, responsive to the output, for generating a transmit timing signal having a frequency equal to the receive timing signal frequency, the means for generating a transmit timing signal further having means for selecting one of the pulses in the output to induce a phase shift of the transmit timing signal relative to the receive timing signal, said phase shift being equal to the difference between the selectable timing differential and a propagation delay between the first and second points; and means, responsive to the transmit timing signal, for transmitting the data from the second point to the first point synchronous to the transmit timing signal.

4. An apparatus as set forth in claim 3, wherein the means for generating the transmit timing signal further includes means for inducing an additional phase shift of the transmit timing signal relative to the receive timing signal, said additional phase shift being equal to whole-number intervals of the data.

5. A method of compensating for propagation delay in communication of data over a transmission path from a first point to a second point, comprising the steps of:

establishing a selectable timing differential between the first and second points as a reference time, said timing differential being selected without using a signal from said second point to said first point;

receiving a receive timing signal;

generating a transmit timing signal, the step of generating a transmit timing signal including the substep of inducing a phase shift of the transmit timing signal relative to the receive timing signal, said phase shift being equal to the difference between the reference time and the propagation delay between the first and second points; and in response to the transmit timing signal, transmitting the data over the path from the second point to the first point.

6. A method as in claim 5 wherein said establishing step further includes the substep of providing said timing differential by digital circuitry.

7. A method of compensating for propagation delay in communication of data over a transmission path from a first point to a second point, comprising the steps of:

establishing a selectable timing differential between the first and second points as a reference time, said timing differential being selected without using a signal from said second point to said first point;

receiving a receive timing signal having a receive timing signal frequency transmitted over the path from the first point to the second point and, in response to the receive timing signal, producing an output having a multiplicity of pulses, the output having a pulse repetition rate equal to a selectable multiple of the receive timing signal frequency and being synchronous to the receive timing signal;

in response to the output, generating a transmit timing signal having a frequency equal to the receive timing signal frequency, the step of generating a transmit timing signal including the substep of selecting one of the pulses in the output to induce a phase shift of the transmit timing signal relative to the receive timing signal, said phase shift being equal to the difference between the reference time and a propagation delay between the first and second points; and in response to the transmit timing signal, transmitting the data over the path from the second point to the first point.

8. A method as set forth in claim 7, wherein the step of generating the transmit timing signal further includes the substep of inducing an additional phase shift of the transmit timing signal relative to the receive timing signal, said additional phase shift being equal to whole-number intervals of the data.

* * * * *